Patented Mar. 14, 1939

2,150,475

UNITED STATES PATENT OFFICE 2,150,475

STABILIZATION OF DITHIOCARBAMATES

Charles F. Winans, Akron, Ohio, assignor to Wingfoot Corporation, Wilmington, Del., a corporation of Delaware No Drawing. Application June 3, 1937,
Serial No. 146,287

9 Claims. (Cl. 23—250)

This invention relates to the stabilization of dithiocarbamates. More particularly it relates to the addition of certain materials to solutions of dithiocarbamates, which added materials inhibit the oxidation of the dithiocarbamate to the corresponding thiuram disulfide.

Certain dithiocarbamates find useful application as accelerators of the vulcanization of rubber. Some find particular application as latex accelerators. As one example of this latter class may be cited piperidinium pentamethylene dithiocarbamate, which is sometimes referred to as pipsalt. When this material is prepared in the form of a paste or a solution in water suitable for incorporation into latex and is allowed to stand, it is susceptible to atmospheric oxidation, tending to form the corresponding thiuram disulfide, dipentamethylene thiuram disulfide. This latter material is insoluble in water and consequently is an undesirable ingredient when the accelerator is added to the latex, an aqueous suspension. In order to eliminate the necessity for separating this material or reincorporating it in the solution in suitable form by ball-milling or other means of dispersion, it is desirable to retard its formation.

By the present invention it has been discovered that, if, to a solution of a water-soluble salt of a dithiocarbamate, a small quantity of a water-soluble sulfide, such as ammonium sulfide or an alkali metal sulfide, is added, the oxidation of the dithiocarbamate to the thiuram disulfide is definitely retarded. For example, if a saturated aqueous solution of piperidinium pentamethylene dithiocarbamate is allowed to stand in contact with air, the solution becomes definitely cloudy within three hours, and in 24 hours a decided formation of crystals has occurred. If, to such a solution ammonium sulfide or an alkali metal sulfide is added in a small quantity, this formation of crystals can be inhibited. For example, to 100 ml. of a saturated solution of piperidinium pentamethylene dithiocarbamate 0.5 of a gram of sodium sulfide was added and the mixture was allowed to stand in contact with air. The solution was still perfectly clear at the end of 24 hours. Analogous results are obtained by the use of 0.5 gram of ammonium sulfide.

Table 1 indicates the relative effectiveness of various quantities of the inhibitor. To a series of test tubes, each containing 10 milliliters of a 5% water solution of piperidinium pentamethylene dithiocarbamate, were added varying amounts of a 4% solution of hydrated sodium sulfide. The number of days before sedimentation occurred was noted in each case.

TABLE 1

(0.5 gram pip-salt used in each test)

| Wt. Na$_2$S.9H$_2$O | Percent Na$_2$S | Time to become cloudy |
|---|---|---|
| 0 | 0 | 1 hr. |
| .0031 | 0.6 | 1 day |
| .0062 | 1.2 | 2 days |
| .0093 | 1.9 | 3 days |
| .0123 | 2.5 | 4 days |
| .0154 | 3.1 | 7 days |
| .031 | 6.2 | 9 days |
| .046 | 9.2 | 14 days |
| .062 | 12.4 | Clear |
| .077 | 15.4 | Clear } 14 days |
| .053 | 18.6 | Clear |

The similar effectiveness of the inhibitors with sodium pentamethylene dithiocarbamate is demonstrated by Table 2, which records the results of a test in which 20 ml. portions of a 5% water solution of this material were placed in each of a series of test tubes. Measured amounts of sodium sulfide were added and the mixtures were allowed to stand in contact with the atmosphere.

TABLE 2

| Amt. 5% soln. | Amount Na$_2$S | Appearance | | |
|---|---|---|---|---|
| | | 4 days | 7 days | 12 days |
| Ml. | Grams | | | |
| 20 | 0 | Cloudy | Crystals | Crystals. |
| 20 | .0015 ( .15%) | Clear | Cloudy | Few crystals. |
| 20 | .0045 ( .45%) | ---do--- | ---do--- | Cloudy. |
| 20 | .0075 ( .75%) | ---do--- | Clear | Slightly cloudy. |
| 20 | .0105 (1.05%) | ---do--- | ---do--- | Do. |

Although this sodium salt is much more stable than the corresponding piperidine salt, the tendency to oxidize and become turbid is still measurably decreased by slight additions of sodium sulfide.

Table 3 shows the results obtained when 20 ml. portions of a 5% aqueous solution of 2-methyl piperidinium 2-methyl pentamethylene dithiocarbamate were treated with sodium sulfide.

TABLE 3

| Amt. 5% soln. | Amount Na₂S | Appearance | | |
|---|---|---|---|---|
| | | 3 hours | 1 day | 5 days |
| Millimeters | Grams | | | |
| 20 | 0 | Cloudy | Brown oil | Brown oil. |
| 20 | .0015 (.15%) | Clear | Cloudy | Slight brown oil. |
| 20 | .0045 (.45%) | ---do--- | Clear | Cloudy. |
| 20 | .0075 (.75%) | ---do--- | ---do--- | Slightly cloudy. |
| 20 | .0105 (1.05%) | ---do--- | ---do--- | Clear. |

This compound is of about the same order of stability as piperidinium pentamethylene dithiocarbamate and responds similarly to treatment with sodium sulfide.

Other water-soluble sulfides, such as potassium sulfide, may be similarly employed an inhibitors and the amount used may be varied to provide the degree of stabilization desired.

The invention is also applicable to other water-soluble dithiocarbamates, such as the alkali metal and amine salts of dithiocarbamic acids, particularly those acids derived from secondary aliphatic amines. In such compounds the aliphatic groups may be straight or branched chain cyclic, saturated or unsaturated, or aryl-substituted. Thus, other dithiocarbamates coming within the scope of the invention are sodium dimethyl dithiocarbamate, potassium diethyl dithiocarbamate, sodium di-isoamyl dithiocarbamate, sodium ditetrahydrofurfuryl dithiocarbamate, sodium butyl cyclohexyl dithiocarbamate, sodium methyl butyl dithiocarbamate, potassium butyl furfuryl dithiocarbamate, difurfurylammonium difurfuryl dithiocarbamate, dibutylammonium dibutyl dithiocarbamate, diethylammonium diethyl dithiocarbamate, butyl cyclohexyl ammonium butyl cyclohexyl dithiocarbamate, sodium dibenzyl dithiocarbamate, etc.

While it is preferred to treat the dithiocarbamates derived from secondary amines, the invention is also applicable to dithiocarbamates derived from primary aliphatic amines such as sodium ethyl dithiocarbamate, sodium isopropyl dithiocarbamate, potassium butyl dithiocarbamate, ethyl ammonium ethyl dithiocarbamate, ammonium furfuryl dithiocarbamate, etc.

Although only the preferred forms of the invention have been described in detail, it will be apparent to those skilled in the art that various modifications may be made therein without departing from the spirit of the invention or the scope of the appended claims, in which it is intended to cover all features of patentable novelty residing in the invention.

I claim:

1. The method of stabilizing aqueous solution of a water-soluble salt of pentamethylene dithiocarbamic acid which comprises adding thereto a water-soluble sulfide.

2. The method of stabilizing an aqueous solution of water-soluble salt of pentamethylene dithiocarbamic acid which comprises adding thereto an alkali metal sulfide.

3. The method of stabilizing an aqueous solution of a water-soluble salt of pentamethylene dithiocarbamic acid which comprises adding thereto an ammonium sulfide.

4. The method of stabilizing an aqueous solution of piperidinium pentamethylene dithiocarbamate which comprises adding thereto sodium sulfide.

5. The method of stabilizing an aqueous solution of piperidinium pentamethylene dithiocarbamate which comprises adding thereto ammonium sulfide.

6. The method of stabilizing an aqueous solution of a dithiocarbamate which comprises adding to an aqueous solution thereof a water-soluble sulfide.

7. The method of stabilizing piperidinium pentamethylene dithiocarbamate which comprises adding a water-soluble sulfide to an aqueous solution of the same.

8. An aqueous solution of a water soluble dithiocarbamate containing a water soluble sulfide.

9. A mixture of water and a water-soluble dithiocarbamate stabilized by the addition thereto of a water-soluble sulfide.

CHARLES F. WINANS.